United States Patent [19]

Thota et al.

[11] Patent Number: 5,578,337
[45] Date of Patent: Nov. 26, 1996

[54] PROCESS FOR EXTRUDING GELLED PRODUCT

[75] Inventors: Hamsa A. P. Thota, St. Simons Island, Ga.; Chandrakant S. Shah, Troy, Mich.

[73] Assignee: Rich Sea-Pak Corporation, St. Simons Island, Ga.

[21] Appl. No.: 382,767

[22] Filed: Feb. 2, 1995

[51] Int. Cl.$^6$ .................................................. A23L 1/05
[52] U.S. Cl. ..................... 426/573; 426/575; 426/517; 426/276
[58] Field of Search .................... 426/573, 302, 426/276, 517, 513; 425/107

[56] References Cited

U.S. PATENT DOCUMENTS

| | | | |
|---|---|---|---|
| 2,317,687 | 4/1943 | Larchar | 18/14 |
| 2,688,153 | 9/1954 | Grebauer et al. | 18/14 |
| 3,069,727 | 12/1962 | Schramek | 18/55 |
| 3,265,778 | 8/1966 | Griffith | 264/3 |
| 3,503,756 | 3/1970 | Wistreich | 99/109 |
| 3,605,649 | 9/1971 | Rundus | 107/54 |
| 3,622,353 | 11/1971 | Bradshaw et al. | 99/109 |
| 3,650,766 | 3/1972 | Smadar | 99/100 |
| 3,698,916 | 10/1972 | Moreland | 99/109 |
| 3,814,560 | 6/1974 | Smadar et al. | 425/104 |
| 3,851,084 | 11/1974 | Rossen et al. | 426/343 |
| 3,885,053 | 5/1975 | Townsend | 426/276 |
| 3,941,538 | 3/1976 | Orlowski | 425/241 |
| 4,006,256 | 2/1977 | Kyros | 426/102 |
| 4,087,222 | 5/1978 | Noel | 425/107 |
| 4,117,172 | 9/1978 | Bradshaw et al. | 426/276 |
| 4,119,739 | 10/1978 | Barwick et al. | 426/573 |
| 4,152,102 | 5/1979 | Sasiela et al. | 425/288 |
| 4,156,587 | 5/1979 | Christian | 425/85 |
| 4,233,016 | 11/1980 | Chin et al. | 425/288 |
| 4,280,803 | 7/1981 | Treharne | 425/99 |
| 4,282,258 | 8/1981 | Forkner | 426/100 |
| 4,286,935 | 9/1981 | Okuno et al. | 425/72 |
| 4,485,062 | 11/1984 | Dawes et al. | 264/171 |
| 4,560,337 | 12/1985 | Chin | 425/288 |
| 5,223,297 | 6/1993 | Theys et al. | 426/514 |
| 5,393,546 | 2/1995 | Thota et al. | 426/276 |

FOREIGN PATENT DOCUMENTS

| | | |
|---|---|---|
| 0009897 | 9/1979 | European Pat. Off. . |
| 531904 | 4/1984 | Spain . |
| 1369198 | 11/1970 | United Kingdom . |
| 1474629 | 8/1974 | United Kingdom . |
| 2032242 | 9/1976 | United Kingdom . |

OTHER PUBLICATIONS

Porex Technologies trade literature entitled "Porex Porous Plastics Fabrication Techniques".
"Extruded Seafood", May 1984 Food Processing.
Mondomix trade literature entitled "Continuous Aerting Systems".

Primary Examiner—Jeanette Hunter
Attorney, Agent, or Firm—Kenyon & Kenyon

[57] ABSTRACT

The present invention is directed to a method and apparatus for a high-volume, mass production process for extruding a gel wherein the gelled extrudate has a preselected shape and is produced without breaking apart and without loss of integrity of the gel. More specifically, the present invention is directed to a method and apparatus for continuously forming a gelling mixture and conveying the gelling mixture into a plurality of extrusion dies in a manner such that shear forces that may be produced during conveyance through the extrusion dies are eliminated during the critical period when the gelling mixture forms a gel. The gelled extrudate may be produced, for example, in the form of onion rings comprised of a substantially homogeneous gel having a preselected shape. An improved method for cutting off the gelled extrudate to produce the onion rings is also disclosed. As compared to prior art methods for mass producing formed onion rings, the subject method produces onion rings having improved taste, texture, flavor, visual appearance and variations in size and diameter that more closely matches the taste, texture, flavor, visual appearance and variations in size and diameter of natural onion rings, and without having the disadvantages associated with natural onion rings.

31 Claims, 7 Drawing Sheets

PROCESS FOR EXTRUDING GELLED PRODUCT

FIELD OF THE INVENTION

The present invention is directed to a product conveyance method and apparatus, the apparatus being suitable for extruding a gelled product wherein the gelled extrudate has a preselected shape and is produced without breaking apart and without loss of integrity of the gel. The gelled extrudate may be produced in the form of onion rings comprised of a substantially homogeneous gel.

BACKGROUND OF THE INVENTION

The need to convey a product is frequently encountered during many industrial processes. For example, an extruder is a well known apparatus utilized to provide continuous mixing and conveyance of ingredients of a product. Extruders are widely used in many industries, e.g. the chemical and food processing industries, to continuously mix ingredients of a product and to form the product by conveying the mixed ingredients through a die having a preselected shape. The continuous processing provided by an extruder often results in an efficient and cost effective alternative to batch processing techniques.

Extruders typically include an arrangement of inlet ports for ingress of various ingredients to be mixed by the extruder, into a mixing chamber. The mixed ingredients are forced through the extrusion die of the extruder by the conveying action of various mechanical elements and onto a conveyor or other processing mechanism for cutting and further processing. The cross-section of the extrusion die is arranged to form the mixed ingredients (referred to as the extrudate), as it is forced through the egress end of the extrusion die, into a desired shape for the product.

Conveyance of a mixture of ingredients through a die often occurs under laminar flow conditions. Product flow under these conditions causes maximum flow velocity at the center of flow, with those portions of the product in contact with surfaces, such as, e.g., extrusion die surfaces, tending to adhere to the surfaces due to the friction. In such circumstances, it is typical for the surfaces of the mixed ingredients in contact with the surfaces of the extrusion die to encounter friction due to the relative movement of the product over the extruder surfaces. This results in shear forces throughout the product as it is conveyed through the extruder and forced through the extrusion die.

The presence of laminar flow with shear forces can degrade product quality. This is particularly true in shear sensitive products, i.e., products that are susceptible to degradation due to the shear forces. Thus, the advantages of continuous mixing and conveying afforded by extrusion processing can be lost due to product degradation when a shear sensitive product is extruded, particularly when the shear sensitive product is of a relatively high viscosity. Moreover, the shear forces can cause physical break up of the product as it is forced through an extrusion die, resulting in degradation of the internal structure and loss of integrity of the product.

In certain ingredient-mixing operations, desired chemical reactions occur between the ingredients. Often the chemical reactions affect the rheological properties of the product. For example, a setting solution can be mixed with other liquid ingredients to set the ingredients into a solid or gel state for shaping and forming. Setting reactions are also utilized to reconstitute food products so that solutions, e.g., containing a source ingredient, can be reconstituted into a gel having the texture and consistency of the original food product used to provide the source ingredient.

A problem with utilizing a continuous extrusion process to obtain a set extrudate having a preselected shape is that when the product begins to set within the extruder, the possibility of degradation and physical break up of the extrudate during conveyance increases after the transition of the mixed ingredients from a liquid phase to a highly viscous solid or gel phase. The high viscosity of the setting gel increases shear forces throughout the gel or gelled product as it is conveyed through the extruder. When the final mixture of the product is shear sensitive, the extrudate tends to degrade and break apart, at least sporadically, as it is conveyed through the extrusion die, significantly limiting the ability to continuously convey, shape, form and cut the extrudate so as to produce an extrudate having a preselected shape in an efficient and continuous manner.

Thus, the desirability and efficiency of continuously processing and conveying ingredients undergoing a simultaneous chemical setting reaction becomes problematical, particularly in an extrusion process involving mixtures that produce gelled products. The inherent continuous mixing, conveying, forming and shaping aspects of an extrusion operation are rendered ineffective for shear sensitive products, especially those undergoing setting reactions that produce gelled products, due to a continuously increasing viscosity and resultant generation of damaging shear forces, as the mixed ingredients undergo transition from a liquid phase to a gel during conveyance through the extruder. Until recently, systems were not known that could provide a method of product conveyance suitable to reduce shear forces so that, for example, an extrusion process of the type described above can be effectively performed to produce gelled extrudates having a preselected shape.

A method and apparatus for overcoming these problems are disclosed in a co-pending application, U.S. Ser. No. 08/023,997, filed Feb. 26, 1993, which is herein incorporated in its entirety by reference, and continuing applications therefrom, which are directed to a two phase conveyance method for transporting shear sensitive extrusion products. While such a method has been found to be useful for reducing or eliminating physical break up and loss of integrity of shear sensitive extrusion products having a preselected shape, improvements in reliability and consistency in performance are disclosed herein when this method is used for high-volume, mass production processes for producing food products that are typically subjected to wide variations in the process conditions and in raw material properties.

It is known that food products, for example, onion rings, may be produced using a process for preparing a shaped and extruded food product wherein a slurry of a food product and an ungelled gel-forming material that normally forms a gel upon exposure to a gelation agent is extruded into an elemental shape while washing the surface thereof with a gelation agent, U.S. Pat. No. 3,650,765. The gelation agent causes immediate formation of a gel skin onto the extruded shape, the skin thus enveloping slurry during further extrusion. The final extrusion product is subjected to further processing to stabilize the slurry. Based on this method, an improved method for forming and discharging the food product has been disclosed, U.S. Pat. No. 4,702,687.

Onion rings currently on the market are typically made from either fresh, natural onions or formed from dried, diced onions using a mass production method such as disclosed in U.S. Pat. No. 4,702,687. The natural product has quality advantages over the formed product. However, the formed onion rings are more suitable for quick service restaurants, which need portion control and consistent cost per serving.

Natural onion rings are made from white onions or yellow onions. The natural onions that are typically used to make onion rings are referred to as "ringers". Ringer onions typically yield more usable rings and have a relatively small amount of double hearts. Onions are seasonal and the quality depends on the variety, season, soil type, climatic conditions and growing practices. As a result, natural onions perform inconsistently during processing. In addition, natural onions spoil during storage such that storage onions may cause processing problems.

Natural onions are typically topped, tailed, peeled and sliced and the individual rings are separated from each other prior to processing. There is a significant loss during this preparatory step. The losses can amount to 30–40% by weight of the onions. Also, the ring thickness varies from ring to ring and results in non-uniform product. Additionally, there is a large variation in the size, shape, weight, flavor and texture of rings made from natural onions.

Battered and breaded natural onion rings are served as an appetizer or side dish in restaurants. Higher-quality, higher-priced restaurants typically serve natural onion rings made on-site and cooked to order. However, natural onions do not hold up well under heat lamps. Higher priced restaurants, thus, must maintain the quality of onion rings served to their customers by constantly obtaining a fresh supply of onions for which they are able to charge a premium price. On the other hand, lower-priced restaurants, as well as value-priced quick service restaurants, serve onion rings fried back from a frozen condition. These restaurants typically sell onion rings as an appetizer or a side dish and charge much less.

Few quick service restaurants have onion rings on their menu. One of the hurdles is that it is very hard to maintain the quality and consistency of the natural product. Also, the cost per serving of natural onion rings places them at a price point higher than what a typical fast-food consumer may be willing to pay. Some fast food restauranteurs have mass-produced formed onion rings on their menu. These formed onion rings are made from dried, diced onions and are perceived to have a lower quality than battered and breaded natural onion rings. In particular, these formed onion rings have a substantially different, generally less desirable taste, texture, flavor and visual appearance, as compared to natural onion rings.

Natural onion products are susceptible to freeze-thaw cycles. Onions are composed mostly of water (>80%) and contain carbohydrates, including pectic substances and fibers and minerals. When frozen and thawed, natural onions typically lose their cellular integrity.

For natural onion rings, separation of the onions from the batter and breading coating system may occur because of excessive shrinkage of the onion rings during cooking. As a result, when someone bites into a battered and breaded natural onion ring, the onion ring may pull out of the coating system and fall on the person's chin causing what is referred to as "chin burn". Because of this problem, natural onion rings are not considered suitable as convenience food products or as hand-held products, which can be eaten by consumers while engaged in another activity such as walking, driving, etc.

SUMMARY OF THE INVENTION

An object of the present invention is to provide an improved method and apparatus for conveyance and extrusion of a shear sensitive extrusion product.

In particular, an object of the subject invention is to provide an improved method for extruding a gelled product that does not break apart or lose its integrity as a gel during extrusion.

Another object of the subject invention is to provide an apparatus for extruding gelled product wherein the gelling mixture forming the gelled product functions as a liquid piston that causes the gelled product to be extruded from the extrusion die.

Still another object of the subject invention is to produce and convey gelling mixture to a plurality of extrusion dies so as to provide a continuous flow of gelling mixtures from a mixing chamber into the extrusion dies.

An advantage of the subject invention is that a gelled extrudate having a preselected shape can be continuously produce in the large production quantities desired for a mass production process.

A further advantage of the subject invention is that gelled extrudate can be reliably and consistently produced in a preselected shape without having the gelled extrudate break apart or lose its integrity as a gel.

Yet another object of the subject invention is to provide an apparatus and method having improved reliability and consistency of performance for high-volume, mass production processes for producing food products. Such processes typically encounter wide variations in process conditions and in raw materials used to produce the food products.

More specifically, an object of the subject invention is to provide an improved method for producing a gelled extrudate that is in the form of onion rings comprised of a substantially homogeneous gel having a preselected shape.

An advantage of the subject invention is that onion rings may be mass produced to match the quality of natural onion rings, in particular, with respect to taste, texture, flavor and visual appearance, and also having the capability of being produced with a consistent, preselected portion size and cost per serving.

More specifically, an advantage of the subject invention is that the individual onion ring dimensions, that is, the height, thickness, diameter and weight, may be preselected to reproduce variations found in onion rings produced from natural product.

A benefit of the subject invention is that the onion ring component of the battered and breaded onion ring goes through a controlled amount of shrink during cooking, thus reducing the chance of part of the onion ring falling away from the coating and falling on someone's chin and causing chin burn.

Still another benefit of the subject invention is that onion rings may be mass produced so as to have a "crisp bite" that is generally desired.

Yet another benefit of the subject invention is that onion rings that eat more like natural onion rings can be made that are also more capable of withstanding temperature fluctuations found in warehousing, distribution, restaurant handling and storage.

DETAILED DESCRIPTION OF THE PREFERRED EMBODIMENTS

The subject invention will now be described in detail for specific preferred embodiments of the invention, it being understood that these embodiments are intended as illustrative examples and the invention is not to be limited thereto.

Generally, the present invention is directed to a method and apparatus for producing gelled products from a liquid mixture of at least two components that chemically react to cause gelling of the mixture. More specifically, the present invention comprises an apparatus having a plurality of extrusion dies, wherein each extrusion die includes a conveyance channel with ingress and egress ends. The apparatus of the present invention further comprises a fluid inlet port that may be opened so as to permit the gelling mixture to flow from the mixing chamber of the mixer into the conveyance channel of the extrusion die while the mixture is still in its liquid phase and before the mixture becomes gelled.

During the stage of the process before the mixture becomes gelled, the liquid mixture is herein referred to as a "gelling mixture". After becoming gelled, the mixture is herein referred to as a "gel" a "gelled product" or a "gelled extrudate". It is to be understood that during the stage that the gelling mixture may be characterized as being a liquid, the gelling mixture is undergoing continuous gelling which continues until the gelling mixture eventually reaches the point that it becomes a gel. Thus, for as long as the mixture is capable of flowing smoothly and continuously as a liquid, the mixture is herein defined as a gelling mixture, but after the mixture tends to move as a single solid body or as a single plug, the mixture is defined as a gel or gelled product. The time from the point at which the chemically reactive materials are first mixed until the point at which the gelling mixture becomes a gel is referred to as the "gel time". The time from the point at which the chemically reactive materials are first mixed until the point at which the gelling mixture enters one of the plurality of extrusion dies is referred to as the "delay period". The duration in time from the point at which the gelling mixture enters the extrusion die until the point at which it becomes a gel is referred to as the "gelling period".

According to a feature of the present invention, after providing flow of gelling mixture into the conveyance chamber of the extrusion die, the extrusion die containing the gelling mixture is then closed for a time interval that is at least long enough to permit the gelling mixture to become a gel. Shear forces that are produced by conveyance of the gelling mixture through the conveyance channel are, thus, completely eliminated during the critical period when the gelling mixture forms a gel. The flow remains stopped in the conveyance channel of the extrusion die for a period, herein called the "rest period", which is long enough to permit the gelled product to be pushed further in the conveyance channel without damage to the gelled product. Such damage may include breaking apart or loss of overall physical integrity of the gel. While the gelling mixture is stopped and allowed to gel in the closed conveyance channel, at least one other conveyance channel of the plurality of extrusion dies is open and being filled with the gelling mixture so as to maintain continuous flow of the gelling mixture from the mixing chamber.

After the gelling mixture forms a gel in the closed conveyance channel, on the next cycle when the extrusion die is again coupled to the mixing chamber, the extrusion die containing the gel is then opened to permit renewed flow of gelling mixture from the mixing chamber into the conveyance channel. The gel, thus, is forced further along the conveyance channel of the extrusion die or it may be forced through the egress end of the extrusion die to form a gelled extrudate having a preselected shape. The gelling mixture entering the conveyance channel functions as a liquid piston and pushes the gelled product in front of it through the conveyance channel and out of the egress end of the extrusion die where the gelled product is cut by a cutter.

Since the gelled product may not have sufficient strength immediately after it has formed to be forced through the egress end without breaking apart or losing its integrity as a gel, the gelled product may be allowed to set for an additional period of time in the conveyance channel before being forced out of the extrusion die as gelled extrudate. For this reason, the length of the conveyance channel is preferably long enough for the gelled product to have an additional setting time before the gelled product is pushed through the egress end as gelled extrudate. Thus, the amount of gelling mixture entering the conveyance channel during each open cycle, that is, the charge of gelling mixture entering the extrusion die per cycle, is preferably about one-half or less of the total volume of the conveyance channel. This means that gelled product that is formed in the conveyance channel has a minimum of one full extra cycle as a setting period. During this period, the gel attains sufficient additional strength so that it may be extruded, cut by a cutter and placed on a conveyor as gelled extrudate having a preselected shape without breaking apart or loss of integrity of the gel.

The plurality of extrusion dies comprises at least two extrusion dies and may comprise as many extrusion dies as is necessary to consistently and reliably permit formation of a gel that is strong enough to be pushed through the conveyance channel and extruded as a gelled product. In a preferred embodiment of the present invention, the subject apparatus comprises from about 6 to about 8 extrusion dies which make up a set or row of extrusion dies. There may be many sets or rows across the width of the conveyor onto which the gelled extrudate is transferred. More preferably, about 6 extrusion dies are included in each set or row of the subject apparatus. The number and size of the conveyance channels of the extrusion dies that are available for receiving the gelling mixture may vary but, in any case, enough extrusion dies are provided so as to assure enough time for the gelling mixture to become gelled between successive cycles of conveying a charge of the gelling mixture into the extrusion die.

Likewise, the passageway between the mixing chamber and the extrusion dies receiving the gelling mixture is such as to assure conveyance of the gelling mixture into the extrusion die before the gelling mixture becomes gelled. In particular, the extrusion dies are capable of receiving flow of gelling mixture in a short enough delay period after forming the gelling mixture in the mixing chamber such that the gelling mixture does not become gelled before entering the extrusion die. In addition, the length of the passageway conveying the gelling mixture from the mixing chamber to the extrusion die, the size and number of the extrusion dies and the rest period of the closed extrusion dies may be controlled so as to account for variations in gel time that may be produced as a function of the varying concentration and reaction rates of the chemically reacting components that produce the gelling mixture. Preferably, the rest period of the closed extrusion die is at least about 3 to about 5 times as long as the gel time of the chemically reacting components. Most preferably, the rest period of the closed extrusion die is at least about 3 times as long as the gel time of the chemically reacting components.

The overall process is a combination of a continuous process, insofar as a gelling mixture is continuously being supplied from a mixing chamber into a plurality of extrusion dies for gelling, and an intermittent process, insofar as flow of the gelling mixture is intermittently stopped in each extrusion die so as to permit gelling in a manner such that the gelled product may be conveyed through the extrusion die without having the gelled material break apart or lose its physical integrity due to deleterious shearing forces.

In the preferred embodiments of the present invention, the gelling mixture comes from a mixing chamber wherein the chemically reacting components are mixed and the gelling mixture is conveyed through a passageway that is designed such that the gelling mixture remains in the mixing chamber and in the passageway for a delay period less than the gel time of the mixture. Most preferably, the gelling mixture continues flowing through the passageway into at least one of the extrusion dies without any portion thereof remaining in any part of the passageway when flow of the gelling mixture into one of the extrusion dies is stopped and flow into the next extrusion die begins. In a preferred embodiment of the subject invention, a mechanical piston is provided so as to push gelling mixture from the passageway adjacent an extrusion die immediately after that extrusion die closes into the next open extrusion die as soon as the next extrusion die opens. By means of this piston, none of the gelling mixture is allowed to remain in any part of the passageway for a delay period long enough to allow gel to be formed in the passageway. In addition, the mechanical piston may cause an additional burst or "jump start" of the gelling mixture to flow into the newly-opened extrusion die immediately after it opens.

At the egress end of the conveyance channel, a cutter is provided for cutting through the gel emerging from the egress end so as to produce a gelled extrudate having a preselected shape. In an illustrative embodiment of the subject invention, the gelled extrudate is produced in the form of an onion ring having a preselected height, thickness, diameter, and weight. Immediately after cutting the gel to form the gelled extrudate, the cutter may be returned to its at-rest position by a spring-actuated return motion. In the apparatus of the subject invention, the cutter may be actuated to cut and produce the gelled extrudate having the preselected shape at the desired high volume mass production rate. The term "onion ring" herein refers to the gelled extrudate before it has been battered and breaded. The gelled onion ring extrudate comprises a substantially homogeneous gel containing onion.

After forming, the onion rings may be further processed to prepare the finished food product. In particular, the onion rings may be battered and breaded in the same mass production process immediately after forming the gelled extrudate. The battered and breaded onion rings may be subsequently fried.

Preferably, onion rings are produced having an average diameter from about 1 and ¼ to about 3 and ½ inches, a height from about 3/16 to about ¾ inches, a thickness from about ⅛ to about 5/16 inches and a weight from about ⅕ to about 1 ounce. More preferably, onion rings are produced having an average diameter from about 1 and ½ to about 3 and ½ inches, a height from about 5/16 to about ⅝ inches, a thickness from about ⅛ to about 5/16 inches and a weight from about ⅕ to about 1/2 ounce.

In a preferred embodiment of the subject invention, the gel is forced to expand or stretch as it emerges through the egress end of the conveyance channel. For example, in forming the subject onion rings, the average diameter of the onion rings may be increased up to about 40% without having the gel break apart or lose its integrity as a gel. Preferably, the gel may be expanded or enlarged by about 5 to 30% as it is forced through the egress end of the extrusion die. Forcing the gel to expand or stretch results in tensile forces being produced within the gel such that one skilled in the art might expect the gel to break apart or lose its integrity as a gel. However, the composition and concentration of the components that chemically react to form a gelling mixture may be selected so as to provide a gel that does not break apart or lose its integrity as a gel when forced through the egress end of the extrusion die. The composition and concentration of the components that chemically react to form a gelling mixture must also be selected in such a manner that the gelling mixture does not form a gel until it has been conveyed from the mixing chamber into the conveyance channel of the extrusion die. It was surprising that the composition and concentration of the components that chemically react to form a gelling mixture could be selected so as to simultaneously meet these conflicting constraints. In particular, it was surprising that a gelling mixture could be produced which would not form a gel too quickly but would produce a gelling mixture that forms a gel in the conveyance channel having sufficient strength to be expanded or stretched, during a high volume, mass production, extrusion process, without having the gel break apart or lose its integrity as a gel due to the tensile forces produced by forcing the gel through the egress end of the conveyance channel. The rest period preferably includes, in addition to the gelling period, an extra setting period so as to allow the gel to develop the desired strength while the gel is still in the conveyance channel.

In summary, the present invention is directed to a process for extruding gelled product comprising mixing at least two components that chemically react to form a gelling mixture; producing flow of the gelling mixture into an extrusion die; substantially stopping flow of the gelling mixture into the extrusion die for a rest period long enough to allow the gelling mixture in the extrusion die to form a gel; and producing renewed flow of gelling mixture into the extrusion die so as to cause the gel to be extruded from the extrusion die and cut as gelled extrudate having a preselected shape.

While it is to be understood that the present invention is directed to a combination of a continuous and an intermittent method for producing shear sensitive extrusion products, the present invention may also incorporate the methods and techniques disclosed in copending application, U.S. patent application Ser. No. 08/023,997. Thus, the conveyance channel of the present invention may also be provided with internal surfaces forming flow surfaces for conveyance of the product through the channel, wherein a fluid flow path communicating with the internal surfaces is arranged to continuously apply a film of fluid over the internal surfaces as the product is conveyed through the channel so that the product is conveyed as a first phase within the channel surrounded by the film acting as a second phase to separate the first phase from the internal surfaces.

The second phase fluid film comprises a low viscosity fluid to minimize friction between the product being conveyed and the internal surfaces of the conveyance channel. This minimizes the development of shear forces within the product. Indeed, a low viscosity second phase film permits the first phase product to flow through the conveyance channel as a plug of material, i.e. a mass of material flowing uniformly in a unitary mass with minimal relative velocity between portions or layers of the first phase. The internal surfaces of the conveyance channel comprise a porous material and the fluid flow path surrounds the porous material on a side thereof opposite to the internal surfaces, to cause the fluid to flow through the porous material and form the film on the internal surfaces for two phase flow according to the present invention.

For use in an extrusion process including the extrusion forming of a product undergoing a simultaneous chemical setting reaction, as described above, the present invention comprises a method and apparatus for first continuously mixing and, immediately thereafter, extrusion conveyance and shaping of reactant ingredients. In a preferred embodiment of the present invention, the reactant ingredients are thoroughly mixed by mechanical action in a high shear-type mixer mechanism and simultaneously conveyed to an extrusion die while still in a liquid phase. The plurality of extrusion dies are arranged so that the length of the dies and the speed of conveyance of the mixed reactant ingredients through the dies permit an adequate amount of time for the mixed reactant ingredients to react chemically with one another and to thereby set in a gel during the rest period when flow is stopped in the conveyance channel. Once in the form of a gel, the reactant ingredients continue flow as a plug due to the strength and physical integrity of the gel. The shape of the extrusion dies are configured to the desired shape for the set extrudate so that the gelled product sets in the desired shape as it is continuously moved through the extrusion die.

The film of low viscosity fluid may be used to provide a lubrication function by separating the high strength gel from direct, friction engagement with the extrusion die surfaces. Relatively high friction motion between the gel and the surfaces of the extrusion die is replaced by relatively low friction engagements on either side of the low viscosity film.

In an exemplary embodiment of the present invention, the setting reaction is delayed until after the reactant ingredients have flowed from the mixer mechanism into the conveyance channel of one of the plurality of extrusion dies. This can be achieved by setting the dimensions of the conveyance channel of the extrusion dies so that back pressure within the mixer mechanism is sufficiently high to preclude setting reactions before the gelling mixture enters one of the conveyance channels.

Thus, the efficiency of continuous extruder conveyance after mixing reactant ingredients that cause gelling, can be utilized due to the intermittent conveyance method of the present invention without encountering potentially deleterious effects of degrading shear forces in the product flow after the setting of the product in a gel.

In one exemplary embodiment of the extrusion feature of the present invention wherein the low-viscosity fluid is used as a lubricant, the surfaces of the extrusion die comprise porous flow surfaces. A system of fluid channels is formed in a housing arranged to mount the extrusion die. A fluid inlet is formed in the housing and a system of reservoirs is arranged within the housing to surround the porous flow surfaces. The fluid channels provide fluid communication between the fluid inlet and the reservoir system.

In this manner, the low viscosity fluid is formed into a uniform film over the ingredient contacting surfaces of the extrusion die by injection of a pressurized flow of the low viscosity fluid into the inlet, which then flows under pressure through the fluid channels and into the reservoir system. The reservoirs are configured so that fluid under pressure within the reservoir system continuously seeps in a generally uniform flow through the porous material and onto the ingredient contacting surfaces of the extrusion die. A continuous injection of the pressurized low viscous fluid is maintained while the gelled product moves through the extrusion die to maintain a continuously lubricating film between the die surfaces and the moving gelled product for a two phase flow.

Figure 1:
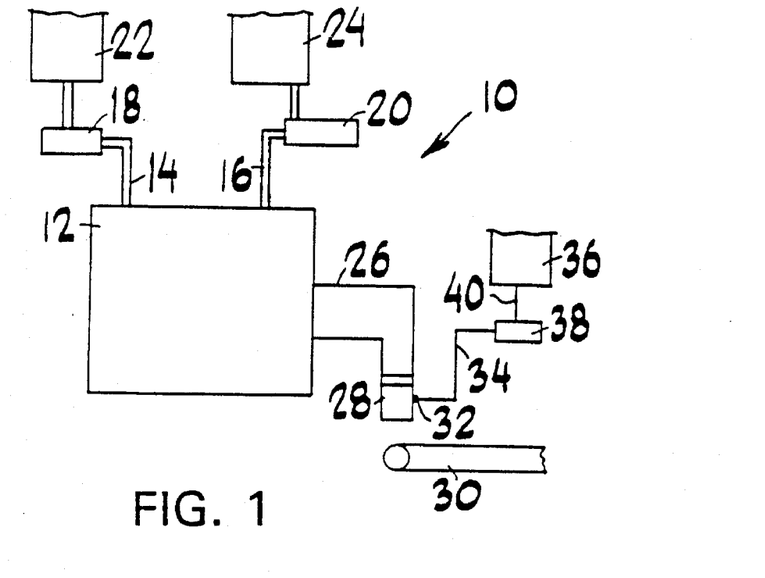
FIG. 1 is a schematic illustration of an extruder system utilizing a two phase flow conveyance method.

Referring now to the drawings, and initially to FIG. 1, there is illustrated an extrusion system according to the two phase flow conveyance method generally indicated by the reference numeral 10. The system 10 comprises a mixer 12 of e.g., the type manufactured by E. T. Oakes Corporation of Hauppauge, N.Y. The mixer 12 includes two inlet ports 14, 16, each coupled to a pump 18, 20, respectively. The pump 18 is coupled to a first supply tank 22 and the pump 20 is coupled to a second supply tank 24. In this manner, the pumps 18, 20 are operated simultaneously to inject the contents of the tanks 22, 24 into the respective inlet ports 14, 16 of the mixer 12 for mixing.

Figure 9:
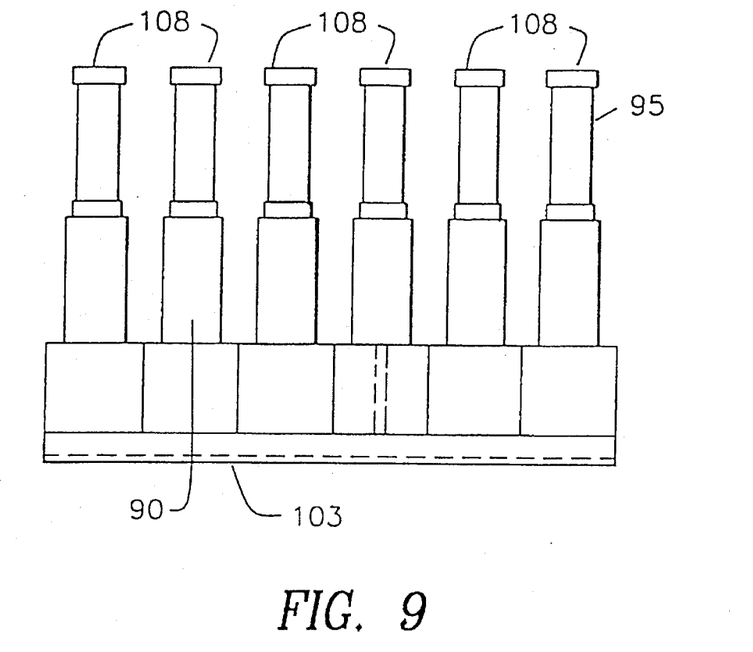
FIG. 9 is a schematic (not to scale) top view of the piston valves and the common channel for the plurality of extrusion dies.

In an exemplary embodiment of the present invention, a slurry or solution to be set, shaped and formed is contained in the first supply tank 22 and a setting solution is contained in the second supply tank 24. The operation of the pumps 18, 20 and the mixer 12 causes the solution of the first supply tank 22 to be thoroughly mixed with the setting solution and conveyed to an outlet channel 26. Pursuant to the present invention, the outlet channel 26 is directly coupled to a common channel that is coupled with the plurality of extrusion dies 108 and 107, as shown in FIGS. 9 and 10.

Figure 2:
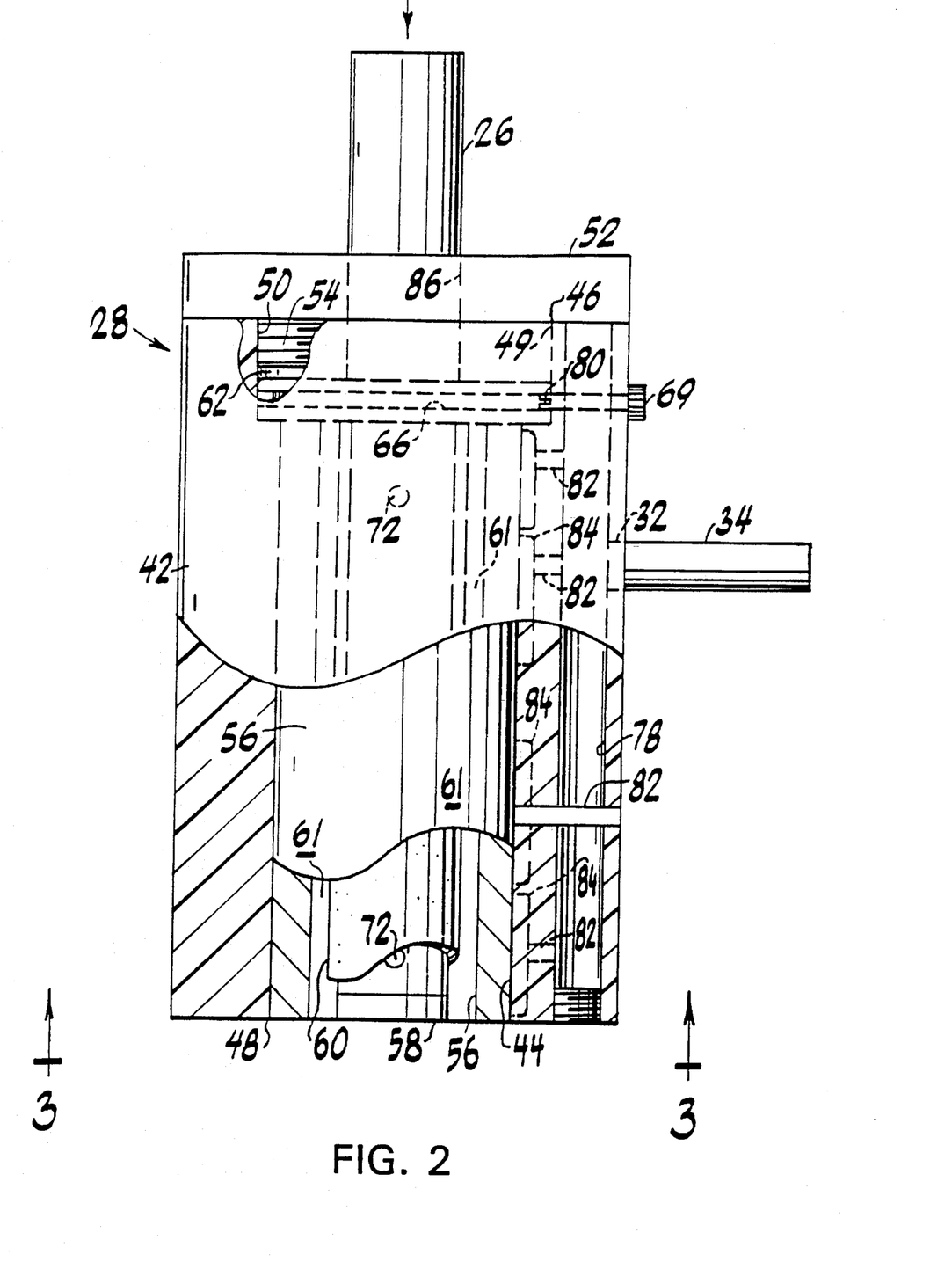
FIG. 2 is a side, partial cross-sectional view of the extrusion die of FIG. 1.
Figure 7:
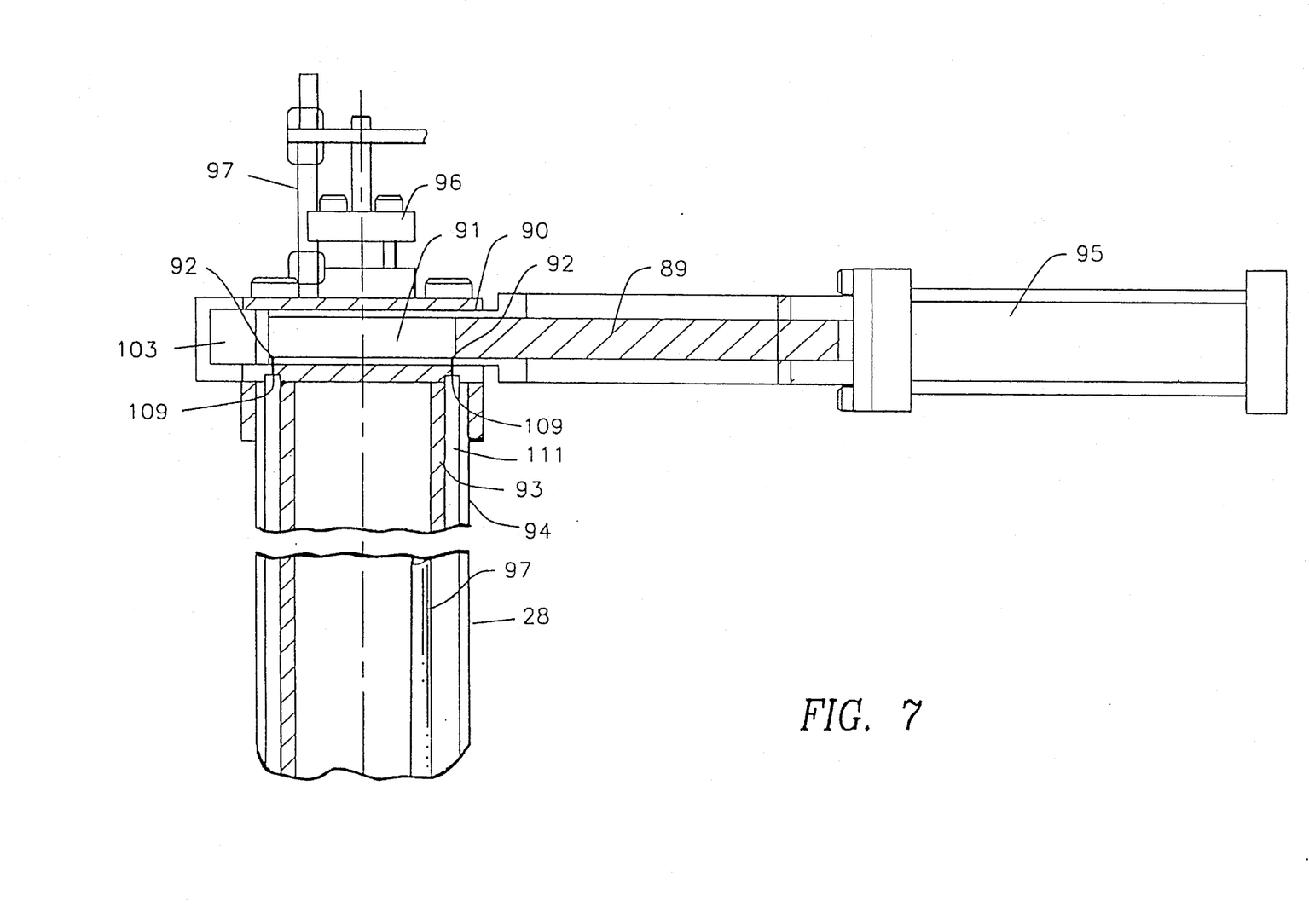
FIG. 7 is a side view of the ingress end of one of the plurality of extrusion dies.
Figure 8:
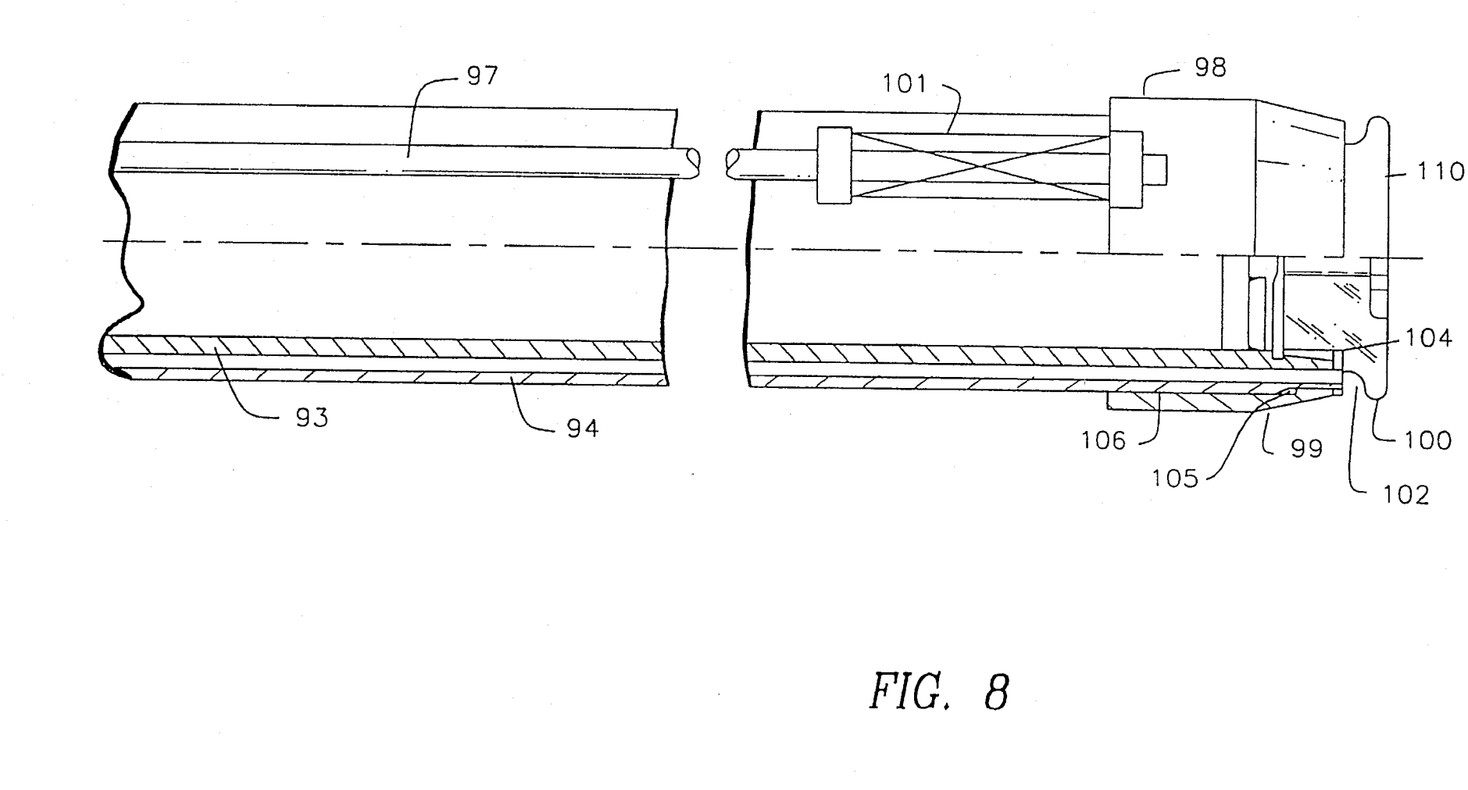
FIG. 8 is a side view of the egress end of one of the plurality of extrusion dies.
Figure 10:
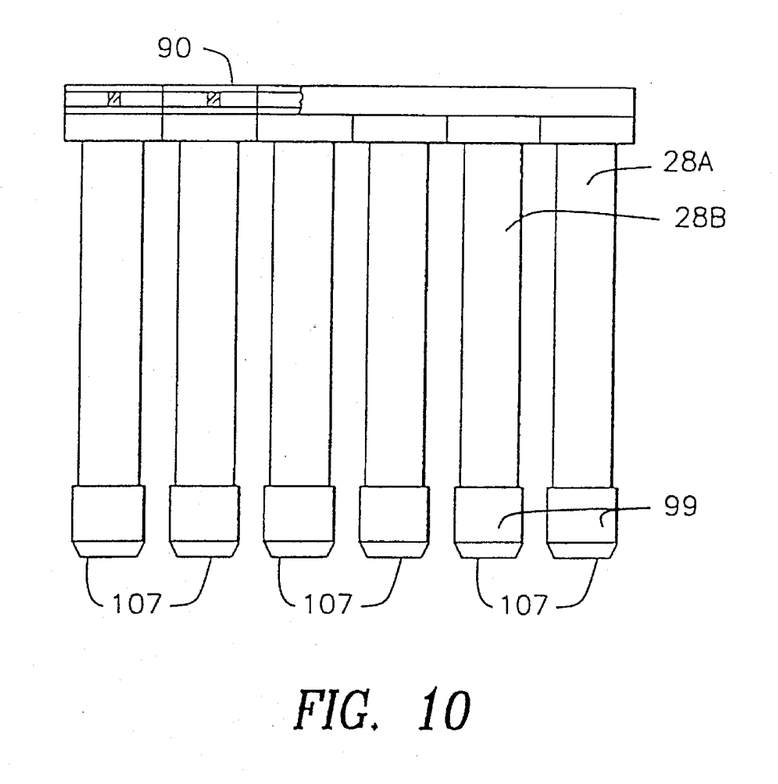
FIG. 10 is a schematic (not to scale) side view of a set of the plurality of extrusion dies.

As illustrated in FIG. 1, each one of the plurality of extrusion dies, as exemplified by ring-making extrusion die 28 as shown in FIG. 2 and FIG. 7, or extrusion dies 28A and 28B in FIG. 10, is arranged adjacent to conveyor 30 in FIG. 1 so that an extrudate exiting from the extrusion die 28A, or from at least one additional extrusion die 28B, can be conveyed to other mechanisms for further processing (not shown). A cutting mechanism, as illustrated in FIG. 8, can be mounted on each extrusion die of each set or row of extrusion dies, more specifically, as illustrated on extrusion dies 28A and 28B, to cut the extrudate as it exits the extrusion dies 28A or 28B.

For extrusion die 28, as illustrated in FIG. 2, fluid inlet port 32 may be coupled by a tube 34 to a pump 38, which is, in turn, coupled to a third supply tank 36 via a tube 40. The third supply tank 36 contains a low viscosity fluid that is pumped into the inlet 32 by the pump 38 to facilitate low shear force flow for the extrudate, as will be described below.

As should be understood, the thorough mixing in the mixer 12 of the solution input from the first supply tank 22 and the setting solution input from the second supply tank 24, results in a chemical reaction causing the mixture to gel. Thus, the mixture undergoes a phase transition after conveyance into the extrusion dies 28A or 28B and prior to egress of the mixture as a gelled extrudate.

To that end, the pumps 18, 20 and the mixer 12 are operated to achieve a speed of conveyance through the mixer 12 and to the extrusion dies 28A and 28B so that the solutions from the tanks 22, 24 are input to the mixer 12, thoroughly mixed and transported to the extrusion dies 28A or 28B, while the mixture remains in a liquid phase. The pumps 18, 20 and the mixer 12 are also operated to achieve mixing and conveyance of the mixture, which can be in an aqueous slurry phase, under a pressure sufficient to force the mixture into and through the extrusion dies 28A or 28B for egress of the mixture, as extrudate, out of the egress end of the extrusion dies 28A or 28B. The dimensions of the dies 28A and 28B can be fixed so that back pressure in the mixer 12 is sufficiently high to prevent gel formation until the gelling mixture flows into the extrusion dies 28A or 28B.

Moreover, the extrusion dies 28A and 28B are configured to have a length sufficient to permit gel forming of the mixed components after conveyance into the die so that the extrudate is in a gel state suitable for cutting and processing upon egress from the egress end of the extension dies 28A or 28B. In addition, the crosssection configuration of the extrusion dies 28A and 28B is formed to mold the gelling mixture into a desired shape, after the mixed components or ingredient materials flow into the die.

Referring to FIG. 7, which shows extrusion die 28 for making rings, gelling mixture may be forced to flow through the common channel 103, into passageway 91 of cylindrical valve 90, through the flow control orifices 92 of cylindrical valve 90 into the orifices 109 of the conveyance channel 111 and then into the conveyance channel 111 itself. The conveyance channel 111, which is in each of the plurality of extrusion dies 28A and 28B, is formed by inner forming cylinder 93 and outer forming cylinder 94. The gelling mixture preferably flows into the common channel 103 from opposite directions and into passageway 91 so as to provide more uniform flow into the extrusion die through the flow control orifices 92. Preferably, as the apparatus indexes from the extrusion die 28A position to the next extrusion die 28B position, actuator 95 of extrusion die 28B pulls piston 89 and valve 90 thus opening the passageway 91 and aligning valve control orifices 92 with conveyance channel orifices 109. This alignment opens the conveyance channel 111 of 28B so that the gelling mixture in common channel 103 continues flowing directly into passageway 91 and then into the open conveyance channel 111 of the next extrusion die 28B. To avoid gelling of gelling mixture remaining in the passageway 91 of extrusion die 28A, a piston 89 is shown which may be used to push out gelling mixture from passageway 91 of extrusion die 28A via common channel 103 into the conveyance channel 111 of the next extrusion die 28B that is open. Preferably, piston 89 is constructed in such a manner that its motion moves valve 90 so as to close flow to the open conveyance channel 111 of extrusion die 28A during the same stroke that it pushes gelling mixture from passageway 91 of extrusion die 28A into the next open conveyance channel 111 of extrusion die 28B.

FIG. 7 also shows cutter actuator 96 that actuates the cutter actuating rod 97 that may be mounted along the longitudinal axis of the extrusion die.

FIG. 8 shows the opposite end of the ring-making extrusion die 28A including the cutter assembly 98. In a preferred embodiment of the subject invention, the cutter 99 is mounted flush to the outside perimeter of the outer forming cylinder 94. As gelled extrudate is forced out of egress end 102, lip 100 forces the cylindrical ringforming extrudate to expand and egress from the extrusion die with an increased average diameter. Preferably, the inner diameter is increased enough so that the gelled extrudate may be completely cut off by a flush-mounted cutter as illustrated in FIG. 8. Preferably, lip 100 is rounded so as to cause the diameter of the gelled product to continuously increase until the gelled product reaches about the point at which the gelled extrudate can be completely cut off by the cutter. When actuated, the cutter moves forward to rounded lip 100, thus cutting through the gel and producing an extrudate ring of the gelled product. The cutter rod tension spring 101 returns the cutter to its normal position after cutting off and producing each extrudate ring of the gelled product. By setting the cutter frequency so as to obtain the desired ring height and by using extrusion dies so as to produce selected inner and outer diameters, extrudate rings can be produced having a preselected height, thickness, diameter and weight.

Water or another food grade lubricant may be provided from annular groove or slit 104, so as to provide flow of the lubricant between the gelled product and shaped plug 110 as the gelled product is forced to expand around shaped plug 110. The flow of lubricant reduces friction between the gelled product and shaped plug 110. Preferably, shaped plug 110 is made of porous material so that flow of lubricant through the pores onto the surface of plug 110 additionally reduces friction between the gelled product and shaped plug 110. The gelled product is forced to expand and be extruded around rounded lip 100 due to pressure from the liquid piston of gelling mixture entering at the ingress end of the conveyance channel. As the gelled product is being expanded, it builds up an elastic tension in the gelled product. By allowing the gel to remain in the conveyance channel for a setting period, so as to increase its strength, the gelled product can be forced to expand up to about 40% without breaking apart or losing its integrity as a gel. At the instant the gelled product is completely cut off by the cutter, it is in the shape of a cut ring that has preferably reached its maximum diameter. Because of the rounded shape of lip 100, the elastic tension in the cut ring causes the extrudate to contract as the extrudate slides off rounded lip 100 and pops out of the extrusion die, substantially returning to the original size and diameter before the gel was expanded. As a result of the elastic tension causing the cut ring to contract around the outer part of rounded lip 100 as part of the ring extends past the point of maximum diameter, the cutter does not need to come in direct physical contact with rounded lip 100. For example, complete cutting of the ring may be accomplished by a cutter that approaches the rounded lip within about one thousandth of an inch. By suitably selecting the slope of cutter 99, the curvature of rounded lip 100 and the degree of expansion encountered by the gelled product as it is forced around the rounded lip, gelled extrudate can be ejected from the extrusion die in the form of cut rings with the reliability and consistency required of a high-volume, mass production process. The net result is that by allowing the gelled extrudate containing gel that is elastically extended to contract, the contraction assists in expelling the extrudate from the extrusion die. The gelled extrudate contracts substantially to the preselected shape of the gel in the extrusion die.

The subject apparatus and method may be used to produce a food product, for example, onion rings, that is produced at a rate of hundreds to thousands of pounds per hour.

More specifically, the process may be used to produce onion rings at a rate, for example, of at least 1000 pounds per hour, and up to 5000 pounds per hour or greater, without having the gelled onion ring extrudate break apart or lose its integrity as a gel. These weights are based on the gelled onion ring extrudate before battering and breading.

With some gels, water may also be supplied at groove 105 on the inner side and near the cutting edge of cutter 99 so as to wash fine gel particles of gel produced during cutting. These particles are thereby prevented from entering and remaining between the cutter surfaces, in particular, between the inner surface 106 of cutter 99 and the outer surface of outer forming cylinder 94.

Referring now to FIG. 2, there is illustrated a side, partial cross-sectional view showing further detail of the extrusion dies 28A and 28B. In the exemplary embodiment of the present invention, the extrusion dies 28A and 28B comprise a generally cylindrical, plastic die body 42. A longitudinally extending channel 44 is formed throughout the entire length of the die body 42 to provide product ingress and egress ends 46, 48, respectively. The channel 44 includes a portion 49 of expanded diameter at the product ingress end 46 of the die body 42. The internal surfaces 50 of the portion 49 are threaded to secure a cylindrical top cap 52 to the die body 42.

To that end, the top cap 52 includes an axially extending, threaded element 54 removably, and threadedly engaged with the internal surfaces 50 to secure the cap 52 to the die body 42, as illustrated in FIG. 2.

In one of the embodiments of the subject invention, a first cylindrical porous sleeve 56 is received into the channel 44 and extends from the product egress end 48 of the die body 42 to the lower end of the enlarged portion 49. The porous sleeve 56 can comprise a food grade polyethylene material manufactured by Porex Technologies Corporation, or a sintered stainless steel material as supplied from the Mott Metalurgical Company in Farmington, Conn., including various pore sizes, as, e.g., 20, 35, 60, 125, 250 or 350 micron pore sizes. In the exemplary embodiment of the present invention, a 20 micron pore size material is used to form the porous sleeve 56.

Figure 3:
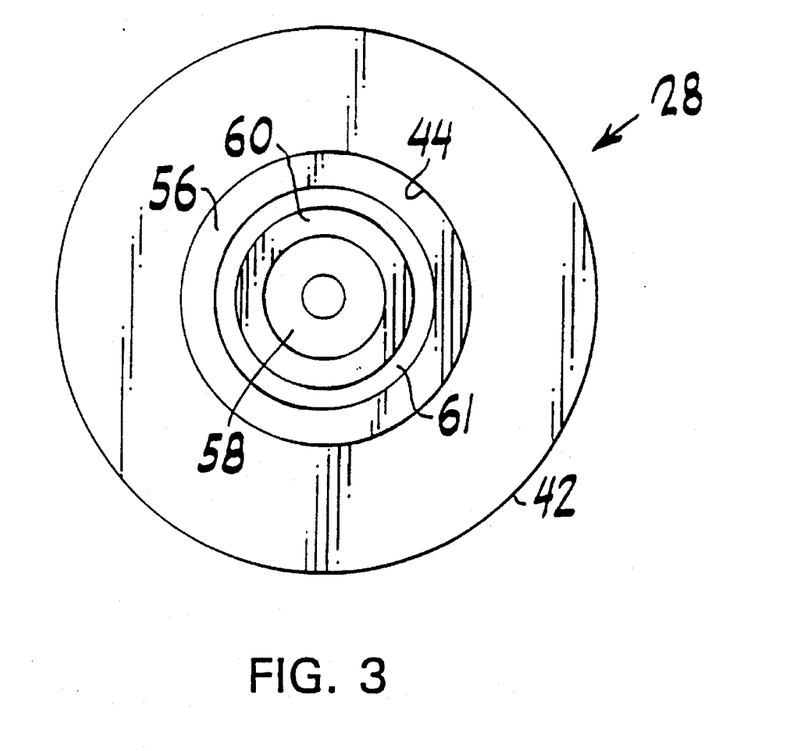
FIG. 3 is an end view of the extrusion die of FIG. 2, taken along line 3—3 of FIG. 2.

Moreover, a plastic spider/mandrel element 58 is arranged to extend within the channel 44 in a co-axial relationship to the porous sleeve 56. The spider/mandrel element 58 mounts a second cylindrical porous sleeve 60, spaced from the first cylindrical porous sleeve 56 and made from a similar material as used to form the first porous cylindrical sleeve 56. The spaced first and second cylindrical porous sleeves 56, 60 define an annular, product flow space 61, acting as a conveyance channel and extending between the first and second porous sleeves 56, 60 from the enlarged portion 49 to the product egress end 48 of the die body 42. The annular space 61 is illustrated in FIG. 3.

Figure 4:
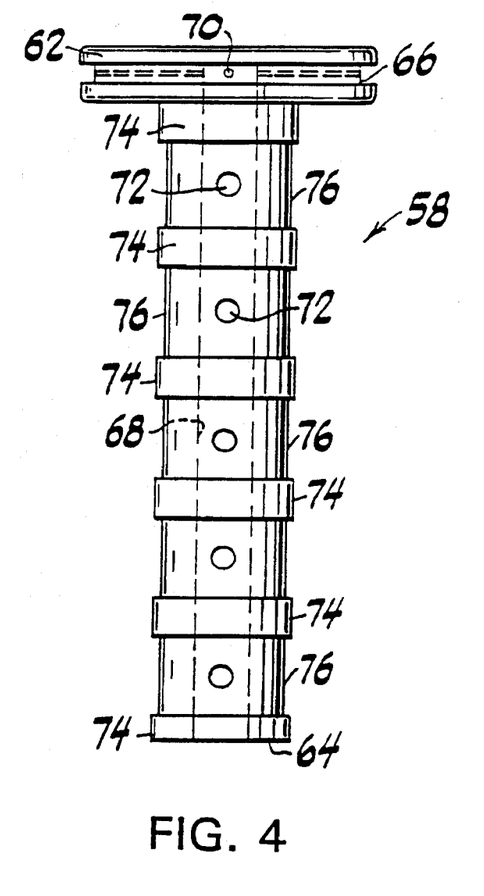
FIG. 4 is a side view of the inside mandrel of the extrusion die of FIG. 2.

A side view of the spider/mandrel element 58 is illustrated in FIG. 4. The element 58 comprises a spider section 62 and an integral mandrel section 64. The spider section 62 is cylindrical in shape and is dimensioned to have a diameter substantially equal to the inner diameter of the enlarged portion 49. The spider section 62 is received within the enlarged portion 49 and rests upon the lower end thereof, as most clearly illustrated, in phantom, in FIG. 2. A circumferentially extending groove 66 is formed in the outer circumference of the spider section 62 and a lubricating fluid channel 68 is formed within the spider/mandrel element 58, extending along the axis of the element 58, from a region axially aligned with the upper end of the circumferentially extending groove 66 to the lowermost end of the mandrel section 64.

Referring briefly to FIG. 2, a plug 69 is received within an opening formed within the die body 42 and is arranged to extend to within the circumferentially extending groove 66 to secure the element 58 within the die body 42.

Figure 5:
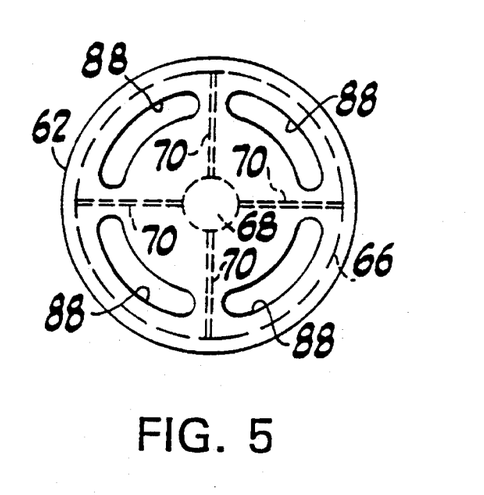
FIG. 5 is a top view of the spider section of the mandrel of FIG. 4.

A series of radially extending fluid flow holes 70 is arranged in the spider section 62 to provide fluid communication between the circumferentially extending groove 66 and the lubricating fluid channel 68 (see FIG. 5). Moreover, a series of openings 72 is formed through the mandrel section 64, with each opening 72 providing fluid communication between the lubricating fluid channel 68 and the outer surface of the mandrel section 64. As clearly illustrated in FIG. 4, the mandrel section 64 includes a plurality of circumferentially extending, raised portions 74 to provide a series of recessed surface areas 76 on the outer surface of the mandrel section 64. As should be understood, the recessed surface areas 76 and second cylindrical porous sleeve 60 define a series of axially spaced, annular shaped reservoirs to receive lubricating fluid from the channel 68 via the openings 72.

Referring once again to FIG. 2, a lubricating fluid feed channel 78 is formed within the die body 42 and extends along a direction parallel to each of the first and second cylindrical porous sleeves 56, 60. The channel 78 is connected to the fluid input port 32, which is, in turn, connected to the tube 34, as described above. The channel 78 is utilized to force a low viscosity lubricating fluid under pressure to surfaces of the cylindrical porous sleeves 56, 60, as will appear. To that end, a fluid flow opening 80 is formed to provide fluid communication between the channel 78 and the circumferentially extending groove 66 so that a lubricating fluid introduced into the channel 78 by the action of the pump 38, via the tube 34 and inlet port 32, flows through the channel 78, into and through the opening 80, around the circumferentially extending groove 66, through the fluid flow holes 70 and into the lubricating fluid channel 68. The pressurized fluid flow continues through the channel 68, through the openings 72 and into the reservoirs defined by the recessed surface areas 76 of the mandrel section 64 and the second cylindrical porous sleeve 60.

The pressurized fluid within the reservoirs continuously seeps through the porous material of the sleeve 60 to form a film of fluid on the surface of the sleeve 60 facing the annular product flow space 61.

In a similar manner, a series of fluid flow openings 82 are sized to yield the required flow for the lubricating fluid and to provide fluid communication between the channel 78 and corresponding ones of a series of cut-out sections 84. Each cut out section 84 extends around the entire outer circumference of the first cylindrical porous sleeve 56, with the cut out sections 84 together covering a substantial portion of the outer surface of the sleeve 56. Thus, fluid flow in the channel 78 also flows through the openings 82 and into the sections 84 from which the fluid continuously seeps uniformly through the first cylindrical porous sleeve 56 to form a film of fluid on the surface of the sleeve 56 facing the annular flow space 61.

The top cap 52 includes a product inlet port channel 86 to receive the outlet channel 26 of the mixer 12. The lowermost end of the threaded element 54 is spaced from the top surface of the spider section 62. In this manner, the mixture of materials flows from the outlet channel 26, through the inlet port channel 86 to within the space defined by the threaded element 54 and the top surface of the spider section 62.

In one of the preferred embodiments as disclosed in U.S. patent application Ser. No. 08/023,997, referring to FIG. 5, the top surface of the spider section 62 is formed to include a series of kidney-shaped holes 88, each aligned above the annular space 61 when the spider/mandrel element 58 is mounted within the die body 42. Accordingly, the mixture within the space between the threaded element 54 and the top surface of the spider section 62 flows through the kidney-shaped holes 88, into the annular product flow space 61 and out the egress end 48. As should be understood, the films of fluid formed on the surfaces of the first and second cylindrical porous sleeves 56, 60 separate the mixture from the surfaces of the extrusion dies 28A and 28B as the gelling mixture flows through the annular space 61. Although the preferred embodiments of the subject invention are as illustrated by FIGS. 7 and 8, it is to be understood that variations of the design disclosed in FIG. 2 may also fall within the scope of the subject invention.

Figure 6:
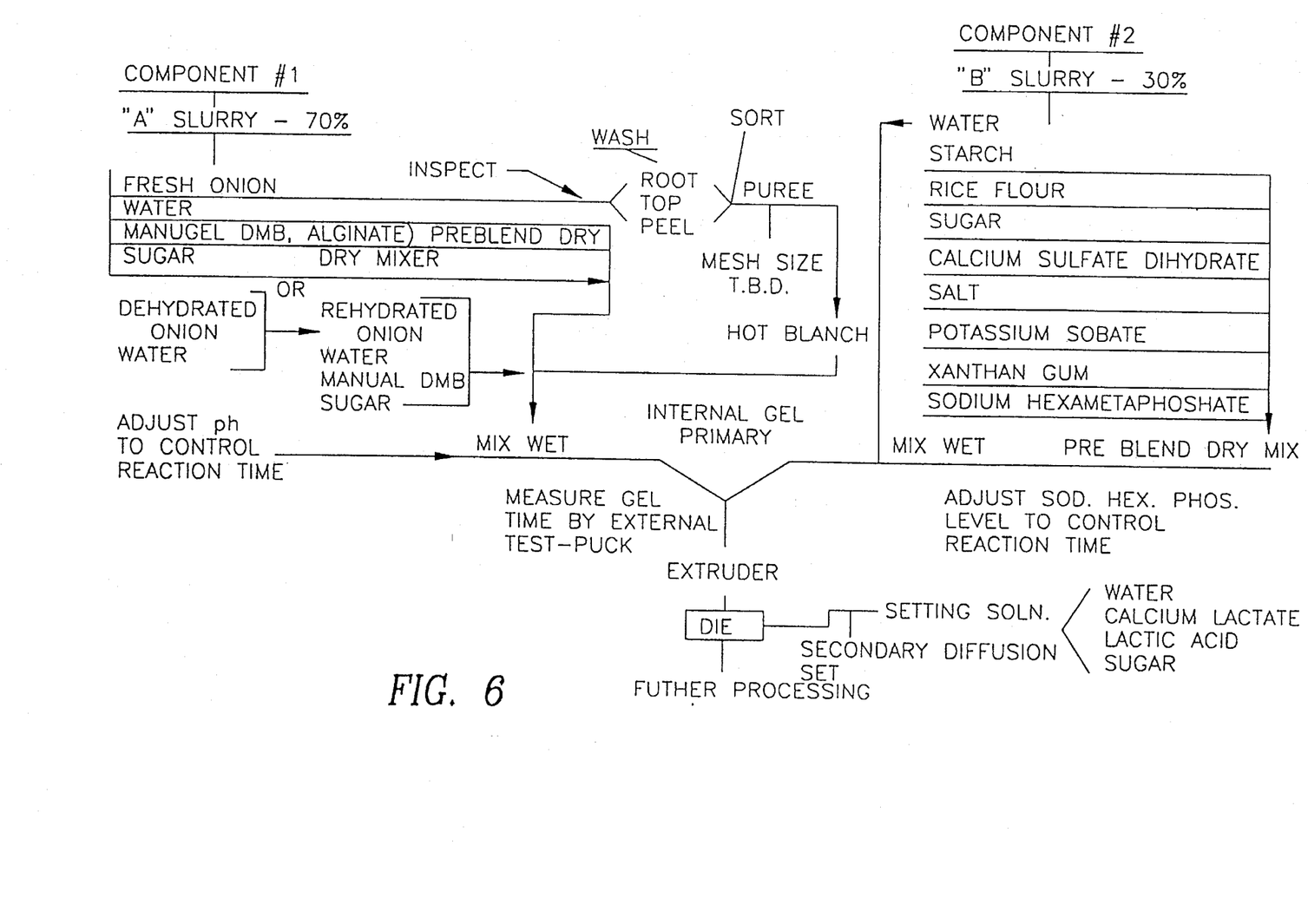
FIG. 6 is a process flow chart of an example of the present invention.

FIG. 6 is a process flow chart of an example of the operation of the above described apparatus utilized to form structured onion rings. Onion may be introduced into the slurry as an onion puree or as rehydrated onion, which is prepared by combining dehydrated onion with water. The rehydrated onion is then combined with additional water, Manugel DMB alginate and sugar to form the slurry. To that end, the solution in the first supply tank 22 comprises a fresh or rehydrated onion slurry having the following formulation:

| "A" SLURRY | |
|---|---|
| INGREDIENTS | |
| Fresh onion puree or rehydrated onion | 60.00% |
| Water | 6.64% |
| Manugel DMB, Alginate | 1.50% |
| Sugar | 1.86% |
| Subtotal | 70% |

The setting solution contained in the second supply tank 24 comprises a slurry having the following formulation:

| "B" SLURRY | |
|---|---|
| INGREDIENTS | |
| Water | 23.55% |
| Starch | 2.00% |
| Rice Flour | 2.00% |
| Sugar | 1.10% |
| Calcium Sulfate Dihydrate | .91% |
| Salt | .25% |
| Potassium Sorbate | .10% |
| Xanthan Gum | .05% |
| Sodium Hexametaphosphate | .04% |
| Subtotal | 30% |

The percentage listed next to each ingredient in the above formulations represents the percentage, by weight, of the corresponding listed ingredient, in the final mixture of the fresh or rehydrated onion slurry and setting solution, upon mixing within the mixer 12. Thus, the subtotals for the "A" and "B" slurries represent the percentage by weight of each slurry in the final mixture.

As illustrated in the process flow chart of FIG. 6, fresh onion is inspected, washed, peeled, pureed and hot blanched. A pre-blended dry mixture of sodium alginate and sugar is mixed with water and then mixed with the fresh onion puree or rehydrated onions, in the percentages by weight indicated above, to form a wet mixture fed into the inlet port 14 by the pump 18. As indicated in FIG. 6, the pH level of the fresh or rehydrated onion wet mixture can be adjusted empirically so as to control the setting reaction time. Lactic acid can be used as an additive to vary the pH level of the "A" slurry.

The "B" slurry comprises a wet mixture formed by mixing water with a pre-blended dry mix consisting of starch, rice flour, sugar, salt, calcium sulfate dihydrate, sodium hexametaphosphate, xanthan gum, and potassium sorbate, in the percentages by weight indicated above. Depending on the texture of the onion ring desired, the level of the xanthan gum may be adjusted or, alternatively, the xanthan gum may be replaced by other food gums such as gellan gum. The setting reaction time can also be controlled by empirically adjusting the level of sodium hexametaphosphate in the pre-blended dry mix.

As described above, the reaction time and fluid flow rates of the pumps 18, 20 are adjusted to achieve a thorough mixing of the "A" and "B" slurries in the mixer 12 without the setting reaction causing the mixed slurries to gel until the product flow enters the extrusion dies 28A or 28B. Gelling occurs through the occurrence of primary internal chemical reactions including reactions between calcium ions provided by the calcium sulfate dihydrate, and sodium alginate to form calcium alginate gel.

As illustrated in FIG. 6, the "A" and "B" slurries are input to the extruder (mixer 12) and flow from the extruder, after mixing, into the extrusion dies 28A or 28B. The low viscosity lubricating fluid fed under pressure into the inlet port 32 comprises water to form a thin liquid film on the surfaces of the cylindrical porous sleeves 56, 60, as described above. Of course, as described above, the film may be used to provides a two phase, nearly shear-stress-free movement of the solidifying mixture of the slurries as it flows through the extrusion dies 28A or 28B to the egress end 48 of the die body 42.

The onion rings thus produced are comprised of a substantially homogeneous gel having a preselected shape. Using the subject method, onion rings have been prepared, for example, in three different shapes, but each shape having substantially the same weight. In particular, onion rings have been prepared with the first shape having an average diameter of about 1.83 inches, a height of about 0.36 inches and a thickness of about 0.18 inches; the second shape having an average diameter of about 2.19 inches, a height of about 0.33 inches and a thickness of about 0.16 inches; and the third shape having an average diameter of about 2.5 inches, a height of about 0.32 inches and a thickness of about 0.14 inches; with each of the three shapes having a breaded weight of about 11.5 g. As compared to prior art, mass-produced onion rings, the subject onion rings have a taste, texture, flavor, visual appearance and variation in size and diameter that more closely matches the taste, texture, flavor, appearance of natural onion rings, and the subject onion rings may be mass produced without having the disadvantages associated with natural onion rings.

It is to be understood that the subject method is not limited solely to producing onion rings but may be used for producing other food products. In particular, the process and apparatus illustrated herein for extruding ring-shaped products can also be used for other shaped products, such as solid or hollow core products by changing the shape of the conveyance channel and by changing the cutting method.

What is claimed is:

1. A process for extruding gel comprising:
   mixing at least two components that chemically react to form a gelling mixture in a mixing chamber;
   providing flow of the gelling mixture from the mixing chamber into an extrusion die;

substantially stopping flow of the gelling mixture from the mixing chamber into the extrusion die for a rest period at least long enough to allow the gelling mixture in the extrusion die to form a gelled mixture; and providing renewed flow of gelling mixture from the mixing chamber into the extrusion die so as to cause the gelled mixture to be extruded from the extrusion die as an edible gelled extrudate having a preselected shape.

2. The process according to claim 1 wherein the gelled extrudate is produced without breaking apart and without loss of integrity of the gel.

3. The process according to claim 1 wherein the extrusion die includes a conveyance channel having internal surfaces to form flow surfaces for conveyance of the gelling mixture through the channel.

4. The process according to claim 3 wherein the process includes the step of simultaneously applying a film of lubricating fluid over the internal surfaces of the conveyance channel of the extrusion die to surround the gelling mixture and separate the gelling mixture from the internal surfaces during conveyance of the mixture through the channel.

5. The process according to claim 1 wherein the extrusion die is one of a plurality of extrusion dies.

6. The process according to claim 5 wherein the plurality of extrusion dies comprises from about 6 to about 8 extrusion dies.

7. The process according to claim 5 wherein the plurality of extrusion dies comprises about 6 extrusion dies.

8. The process according to claim 5 wherein said plurality of extrusion dies forms a set or row.

9. The process according to claim 1 wherein the components of the gelling mixture comprise a food product and an alginate.

10. The process according to claim 1 wherein said food product comprises onion.

11. The process according to claim 1 wherein the gelled extrudate comprises an alginate gel.

12. The process according to claim 1 wherein the components of the gelling mixture include an alginate and a source of calcium to form a calcium alginate gel.

13. The process according to claim 1 wherein the gelled extrudate is in the form of an onion ring.

14. A process for extruding gel comprising:

mixing at least two components that chemically react to form a gelling mixture in a mixing chamber;

providing flow of the gelling mixture from the mixing chamber into an extrusion die;

substantially stopping flow of the gelling mixture from the mixing chamber into the extrusion die for a rest period at least long enough to allow the gelling mixture in the extrusion die to form a gelled mixture; and providing renewed flow of gelling mixture from the mixing chamber into the extrusion die so as to have the renewed flow of gelling mixture function as a liquid piston causing the gelled mixture to be extruded from the extrusion die as an edible gelled extrudate having a preselected shape.

15. A food product comprising a gelled extrudate obtained by:

mixing at least two components that chemically react to form a gelling mixture in a mixing chamber;

providing flow of the gelling mixture from the mixing chamber into an extrusion die;

substantially stopping flow of the gelling mixture from the mixing chamber into the extrusion die for a rest period at least long enough to allow the gelling mixture in the extrusion die to form a gelled mixture; and providing renewed flow of gelling mixture from the mixing chamber into the extrusion die so as to cause the gelled mixture to be extruded from the extrusion die as an edible gelled extrudate having a preselected shape.

16. The food product of claim 15 wherein the length of said rest period is long enough such that said gel is capable of being expanded up to about 40% without breaking apart or losing its integrity as a gel when said gel is extruded.

17. The food product of claim 15 wherein the length of said rest period is long enough such that said gel is capable of being expanded at least about 30% without breaking apart or losing its integrity as a gel when said gel is extruded.

18. The food product of claim 15 wherein said gelled extrudate is comprised of a substantially homogeneous gel.

19. The food product of claim 15 wherein said gelled extrudate comprises onion and is in the shape of an onion ring.

20. The food product of claim 19 wherein said onion comprises fresh or rehydrated onion.

21. The food product of claim 19 wherein said onion ring has an average diameter from about 1 and 1/4 to about 3 and 1/2 inches, a height from about 3/16 to about 3/4 inches, a thickness from about 1/8 to about 5/16 inches and a weight from about 1/5 to about 1 ounce.

22. The food product of claim 19 wherein said onion ring has an average diameter from about 1 and 1/2 to about 3 and 1/2 inches, a height from about 5/16 to about 5/8 inches, a thickness from about 1/8 to about 5/16 inches and a weight from about 1/5 to about 1/2 ounce.

23. The gelled food product of claim 19 wherein said onion ring is battered and breaded.

24. The gelled food product of claim 23 wherein said battered and breaded gelled product is fried.

25. A high-volume, mass production process for producing a food product comprising:

mixing at least two components that chemically react to form a gelling mixture in a mixing chamber, wherein at least one of said two components comprises a food product;

providing flow of the gelling mixture from the mixing chamber into an extrusion die;

substantially stopping flow of the gelling mixture from the mixing chamber into the extrusion die for a rest period at least long enough to allow the gelling mixture in the extrusion die to form a gelled mixture; and providing renewed flow of gelling mixture from the mixing chamber into the extrusion die so as to cause the gelled mixture to be extruded from the extrusion die as an edible gelled extrudate having a preselected shape.

26. The process according to claim 25 wherein said gel is capable of being expanded up to about 40% without breaking apart or losing its integrity as a gel when said gel is extruded.

27. The process according to claim 25 wherein said gel is capable of being expanded at least about 30% without breaking apart or losing its integrity as a gel when said gel is extruded.

28. The process according to claim 25 wherein said gelled extrudate is produced without breaking apart and without loss of integrity of the gel.

29. The process according to claim 25 wherein said gelled extrudate comprises onion and is in the shape of an onion ring.

30. The process according to claim 25 wherein said gelled extrudate is produced at a rate of at least 1000 pounds per hour.

31. The process according to claim 25 wherein said gelled extrudate is produced at a rate of at least 5000 pounds per hour.

* * * * *